US009504208B2

(12) United States Patent
Adolf

(10) Patent No.: US 9,504,208 B2
(45) Date of Patent: Nov. 29, 2016

(54) PLANTER SYSTEM

(71) Applicant: Steven Adolf, Pembroke Pines, FL (US)

(72) Inventor: Steven Adolf, Pembroke Pines, FL (US)

( * ) Notice: Subject to any disclaimer, the term of this patent is extended or adjusted under 35 U.S.C. 154(b) by 62 days.

(21) Appl. No.: 14/338,436

(22) Filed: Jul. 23, 2014

(65) Prior Publication Data

US 2015/0027046 A1    Jan. 29, 2015

Related U.S. Application Data

(60) Provisional application No. 61/859,101, filed on Jul. 26, 2013.

(51) Int. Cl.
*A01G 9/02* (2006.01)

(52) U.S. Cl.
CPC ........................................ *A01G 9/02* (2013.01)

(58) Field of Classification Search
CPC .......... A01G 9/02; A47J 27/10; A47G 19/02
USPC .......... 47/65.5, 41.13, 41.15, 44, 45, 46, 47, 47/66.1, 66.3, 66.4, 66.5, 66.6, 67, 68, 69, 47/70; 220/573.4, 573.5, 574.3, 4.26, 4.31
See application file for complete search history.

(56) References Cited

U.S. PATENT DOCUMENTS

| | | | | |
|---|---|---|---|---|
| 2,514,269 A * | 7/1950 | Wilberschied | ........... | A01G 9/02 47/81 |
| 2,741,875 A * | 4/1956 | Van Staalduinen | ...... | A01G 9/10 47/75 |
| 4,077,511 A * | 3/1978 | Mosijowsky | .......... | A01C 21/00 137/268 |
| 4,142,324 A * | 3/1979 | Magyar, Jr. | .............. | A01G 9/10 47/75 |
| 5,044,120 A * | 9/1991 | Couch | ....................... | A01G 9/02 47/73 |
| 5,953,859 A * | 9/1999 | Cochran | ................. | A01G 9/028 47/41.1 |
| 6,223,466 B1 * | 5/2001 | Billings | .................... | A01G 9/02 47/75 |
| 7,171,781 B1 * | 2/2007 | Southern | ................... | A01G 9/02 206/423 |
| 8,065,834 B2 * | 11/2011 | Eckert | ..................... | A01G 9/028 47/66.1 |
| 9,010,021 B1 * | 4/2015 | Rettger, II | ............. | A01G 27/06 47/66.1 |
| 2007/0084107 A1 * | 4/2007 | Ganti | ........................ | A01G 9/02 47/39 |
| 2013/0133255 A1 * | 5/2013 | Wu | ........................ | A01G 27/02 47/66.1 |

* cited by examiner

*Primary Examiner* — Kristen C Hayes
*Assistant Examiner* — Ebony Evans
(74) *Attorney, Agent, or Firm* — The Concept Law Group, P.A.; Mark C. Johnson; Erin A. Martin

(57) ABSTRACT

A planter system has a base and an insert. The base is to be placed in the ground and includes a top, outwardly extending lip to limit the depth that the planter may be inserted into the ground. The base includes water drainage apertures and an upper channel to direct water into the interior of the base. The insert includes water drainage apertures and preferably at least one vertical channel to direct water from the upper channel along the exterior of the insert and into the base.

12 Claims, 5 Drawing Sheets

PLANTER SYSTEM

CROSS-REFERENCE TO RELATED APPLICATION

The present application claims priority to U.S. Provisional Patent Application No. 61/859,101 filed Jul. 26, 2013, the entirety of which is hereby incorporated by reference.

BACKGROUND

The present description relate to a planter system and, more particularly, to an improved planter system that provides for better drainage, better fertilization of plants, facilitates both planting and removal of plants, and reduces root rot.

Previously, plants and flowers, etc., that were purchased in containers were transferred and/or replanted in one of two ways. First, the plants were removed from the container and placed into a hole that was concurrently dug or formed in the ground. Second, the plants could remain in the planter and then the planter was placed within the hole in the ground.

Each of these methods had drawbacks. First, removing the plant and placing the plant in the ground, i.e. replanting was labor intensive. Other problems with replanting was that the hole in the ground frequently had to be enlarged if it was too small, or filled-in if it was too larger. If the soil included stones, twigs and the like, these tended to fall into the hole thus necessitating making the hole larger in advance. When the plant was to be replaced for any reason, there were two options. Merely pull the plant upwardly, which frequently caused only part of the plant to be removed, or enlarge the hole. Again, these were all labor intensive options.

In a second approach, a planter containing the plant was placed in the ground. The planter could be removed when the plant was to be replaced for any reason. Typically, however, planters of this type did not provide adequate drainage and the plant root suffered root-rot. Furthermore, when the planter was removed, surrounding soil, stones, etc., tended to fall into the hole thus creating another labor intensive approach when a new planter was to be placed in the ground.

SUMMARY

The present approach overcomes these shortcomings by providing an improved planter system. The improved planter system may include a first planter part to be inserted into a hole in the ground and a second planter part, in which the plant is positioned. The second planter part is removably inserted into the first planter part. In this approach, when it is time to move or replace a plant, only the second planter part, containing the plant, is removed while the first planter part preferably remains in the ground. Then another "second planter part" with a plant therein, may be inserted into the first planter part.

References to plants should be construed in the broadest sense to include but not be limited to plants and flowers of all kinds.

BRIEF DESCRIPTION OF THE DRAWINGS

In the drawings, wherein like reference numerals identify corresponding components.

DETAILED DESCRIPTION

Figure 1:
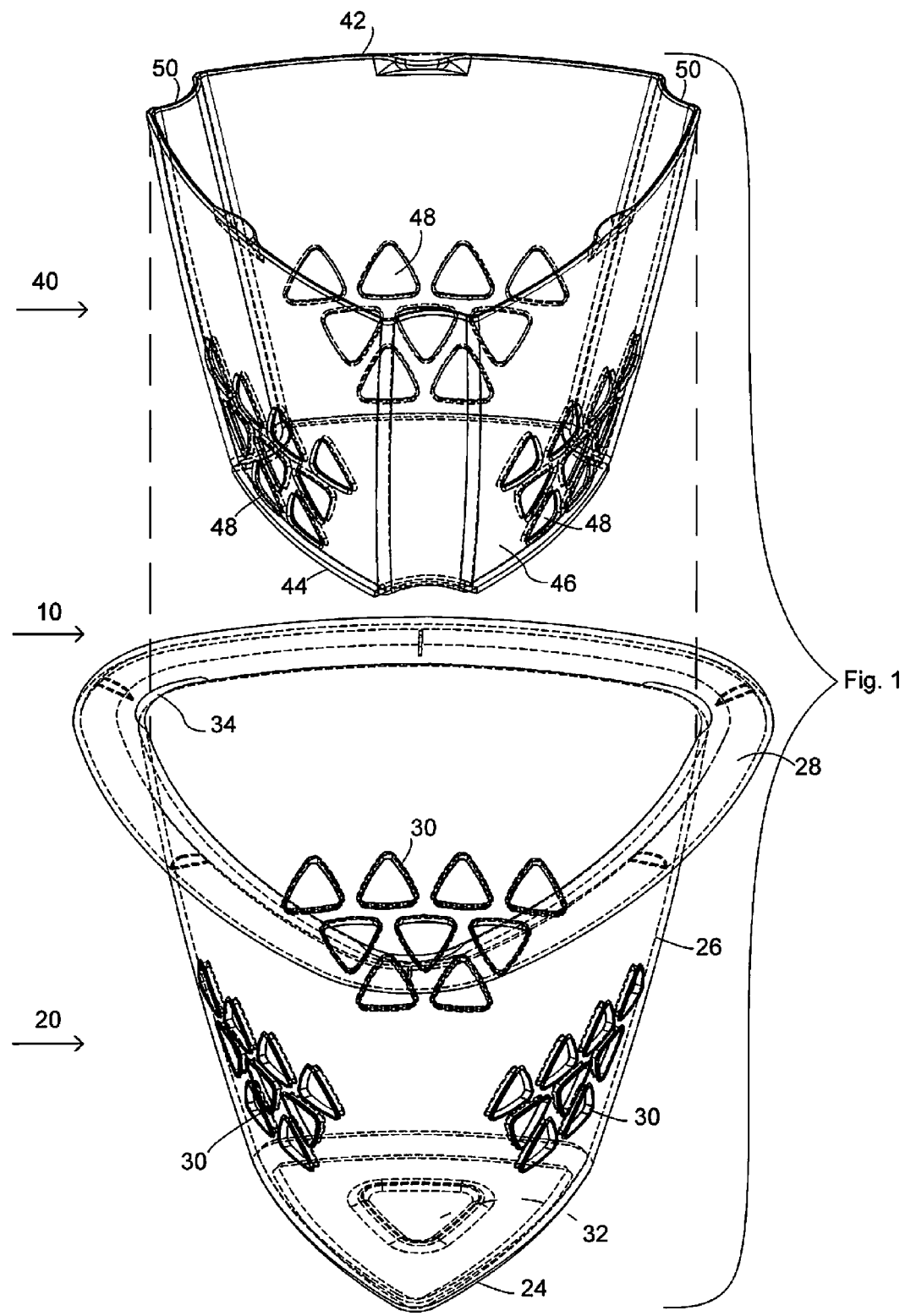
FIG. 1 is an exploded diagrammatic illustration of the present planter system.
Figure 2:
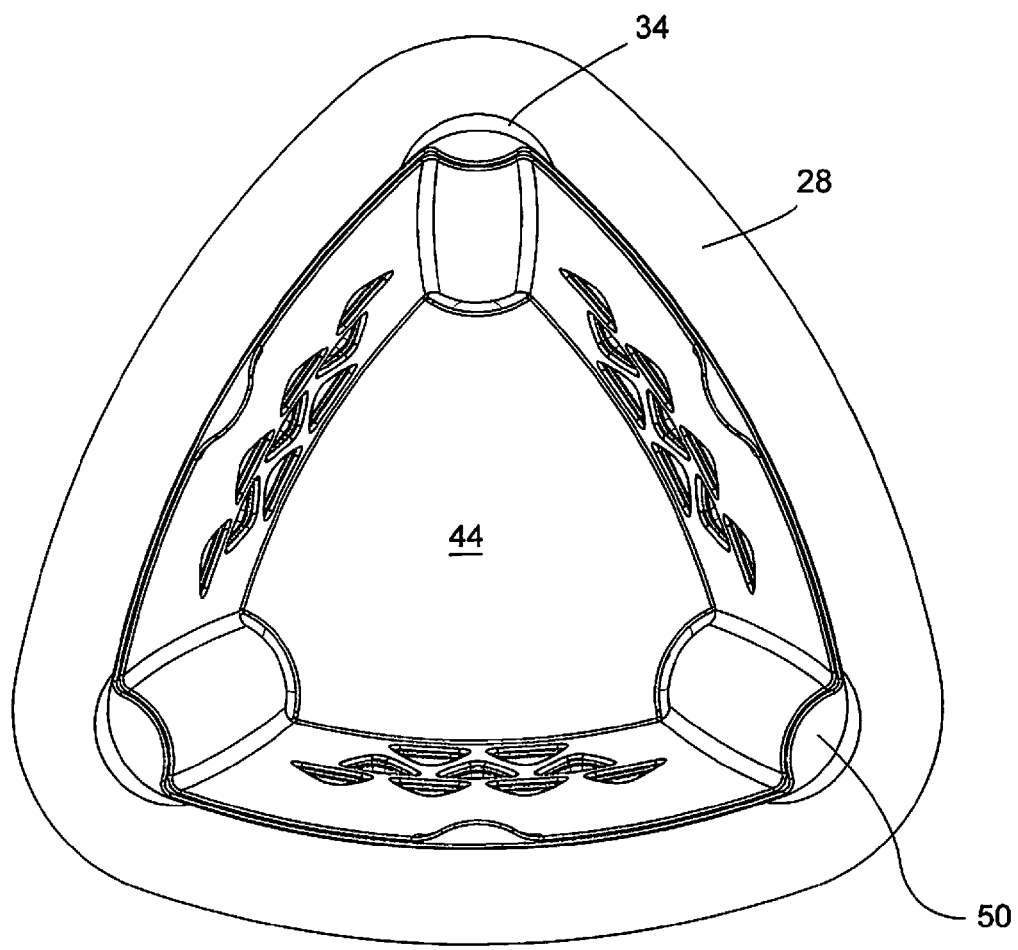
FIG. 2 is a plan view of the planter system of FIG. 1.
Figure 3:
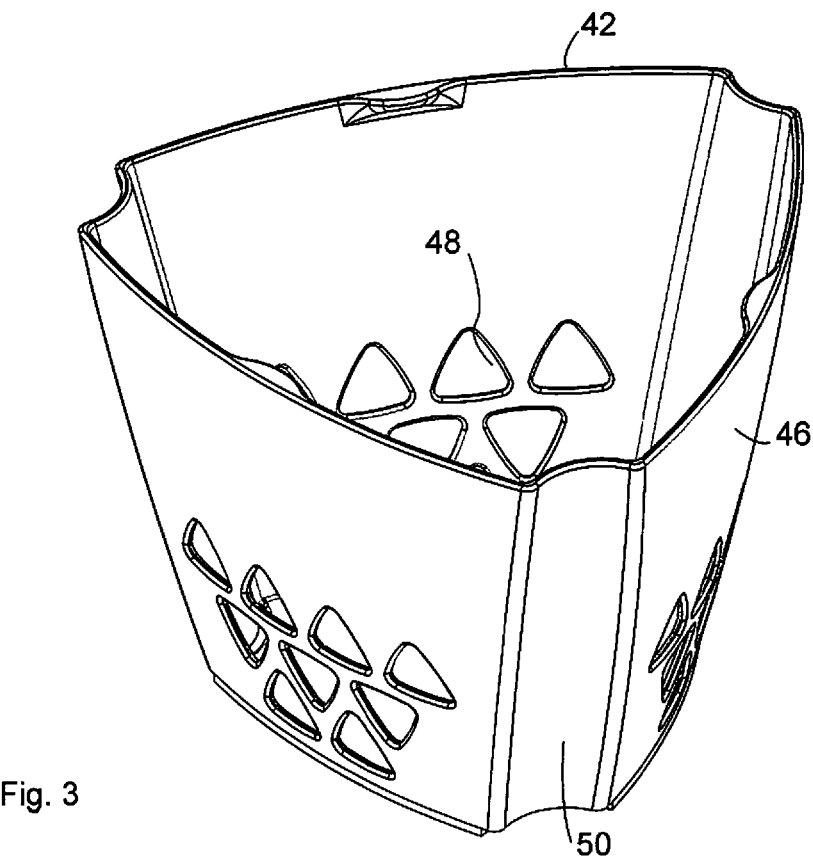
FIG. 3 is a perspective illustration of one part of the planter system of FIG. 1.
Figure 4:
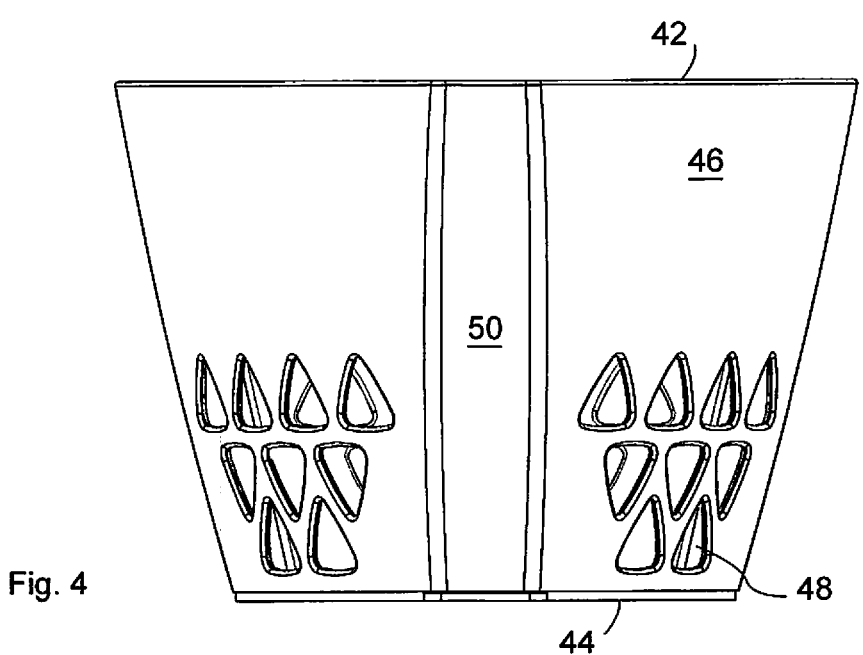
FIG. 4 is a front elevation view of one part of the planter system of FIG. 1.

In the following description and claims, terms such as but not limited to top and bottom are understood to be orientation dependent and, therefore, are to be construed as illustrative relative to the various Figures rather than limiting in any way.

Referring first to FIGS. 1 through 4, a planter system 10 includes a first planter part 20, to be placed in the ground, and a second planter part 40 to be inserted or nested into the first planter part. These may, in a non-limiting illustrative manner, be thought of as a base and an insert.

The first planter part or base 20 includes an open top 22 and, a closed bottom 24 and, when viewed from above, may be triangular in cross-section. The top and bottom are interconnected by a side wall 26 and the interior of the base is open. The wall terminates in an outwardly extending lip 28, preferably concave, and there are numerous apertures 30 through the wall. The bottom 24 may include an upwardly opening receptacle 32 into which nutrients for the plant may be placed. The lip 28 may be of a suitable size and shape to assist in retaining or stabilizing the base in the ground. The lip 28 includes an interior circumferential channel 34 that will be explained in greater detail below.

The planter insert 40 includes an open top 42 and, a closed bottom 44 and, when viewed from above, also may be triangular in cross-section. The top and bottom are interconnected by a side wall 46 and the interior of the insert is open to receive a plant. There are numerous apertures 48 through the wall. The wall is provided with one or more channels 50 preferably of inwardly curved configuration when viewed from above. The channels preferably extend the full length of the wall, from top to bottom.

Each of the base 20 and insert 40 may be tapered, wider at the top and narrower at the bottom, and the size and shape of the open interior of the base is such as will accommodate or receive the exterior of the insert. Thus the insert may fit or nest within the base. Preferably, the length of the base, from top to bottom, is greater than the length of the insert, from top to bottom, so that there is a vertical space between the interior of the base and the exterior of the bottom of the insert. Alternatively, or additionally, the size and shape of the base and insert may be such that the insert is force-fit into the base thus providing for additional stability.

In use, a hole is prepared in the ground and the base is inserted into the hole. Nutrients may be placed in the receptacle 32 in the base. The insert 40 containing a plant is then placed within the base 20.

The one or more circumferential channels 34 in the base function to direct water flow around the top of the insert and down the one or more vertical channels 50 in the insert. This assists in providing water to the roots of the plants. The holes 30 in the base and 48 in the insert, which may be of any shape, size and quantity, carry excess water outwardly of the plant to assist in avoiding root rot. Plant food, pre-packaged nutrients, etc., may be placed within the receptacle 32 in the base.

If it is necessary or desirable to increase the nutrients for the plant, the insert containing the plant may be conveniently removed, additional nutrients placed within the receptacle, and the insert placed back in the base.

If or when it is desirable to change the appearance of landscaping, inserts containing flowers of one color, for example, may be removed from the base and inserts containing flowers of another color may be inserted into the base. If or when it is necessary to replace diseased or dead plants, again, the insert may be removed from the base and another insert may be placed in the base. Indeed, the inserts may be reused although this tends to defeat the labor-saving benefit of the present system.

FIGS. 1 through 4 illustrate the vertical channels 50 at the apex of the triangular configuration of the insert. However, it should be appreciated that this also is illustrative in that the vertically extending channels may be placed wherever desired along the periphery of the insert.

As described above, the planter system illustrated in FIGS. 1 through 4 is triangular shaped when viewed from above.

Figure 6:
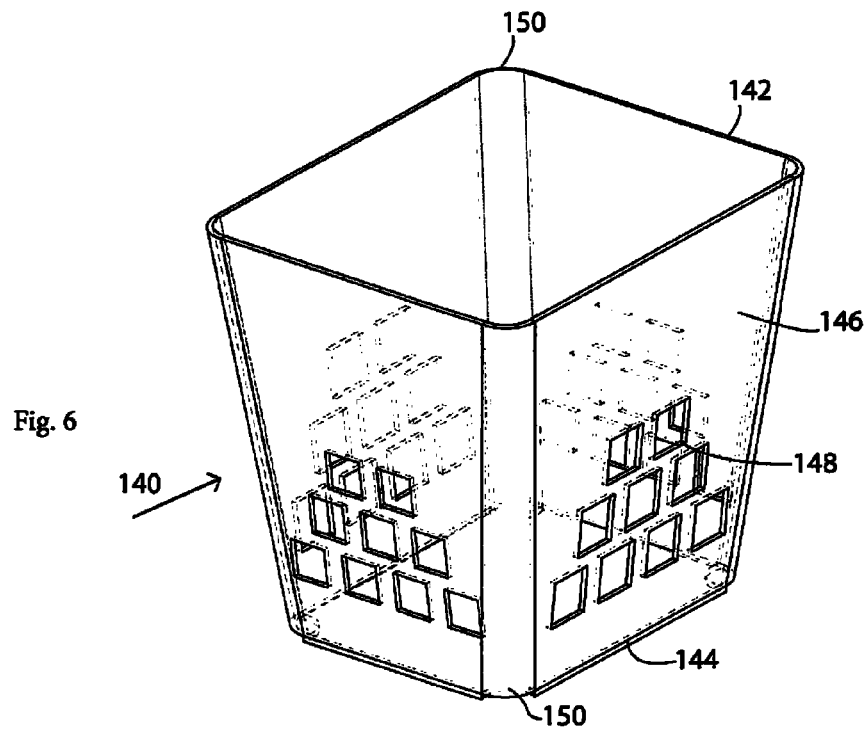
FIG. 6 is a perspective illustration of one part of the planter system.
Figure 5:
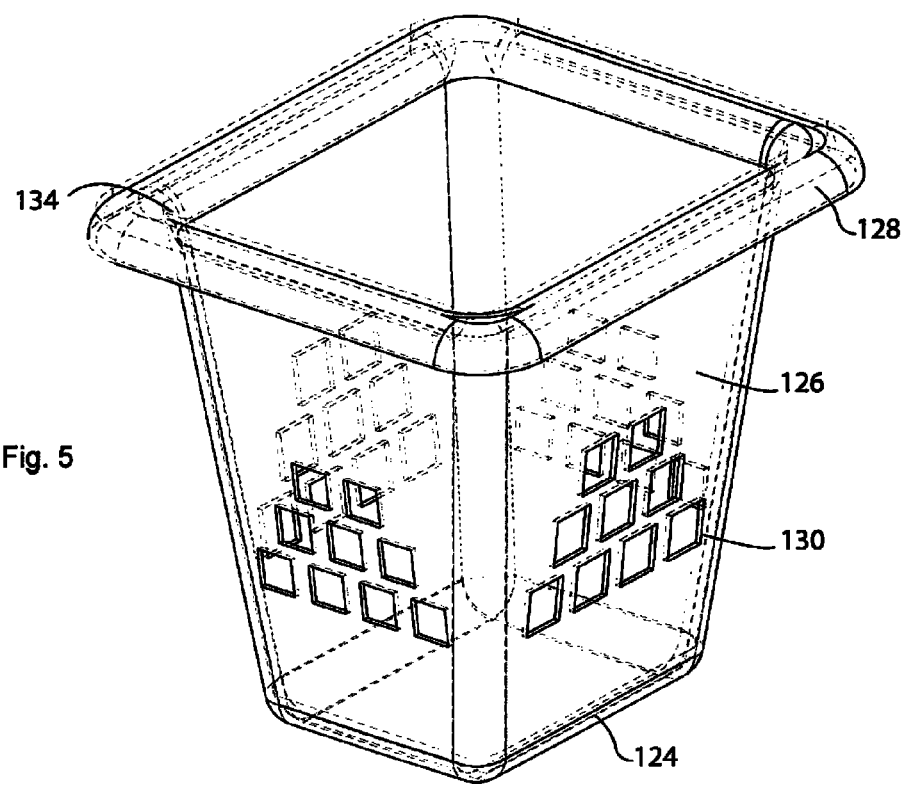
FIG. 5 is a perspective illustration of one part of the planter system.

FIGS. 5 and 6 illustrate another planter system including a base 120 and an insert 140 of square configuration when viewed from above. It should be appreciated that a square is a subset of a rectangle and, therefore, in a broader sense FIGS. 5 and 6 illustrate a rectangular planter system. The parts of the planter system of FIGS. 5 and 6 are identified by the same two digit numbers as the corresponding parts of FIGS. 1 through 4 and, in addition, in FIGS. 5 and 6 the two digit numbers are preceded by the number 1. Thus, in FIGS. 5 and 6, the base 120 has a bottom 124 and side wall 126, holes 130 through the side wall and a top lip 128. The bottom or insert 140 includes a top 142, a bottom 144, and a sidewall 146, with holes 148 through the side wall. The use of the components of FIGS. 5 and 6 is the same as the components of FIGS. 1 through 4 and therefore will not be repeated.

Figure 8:
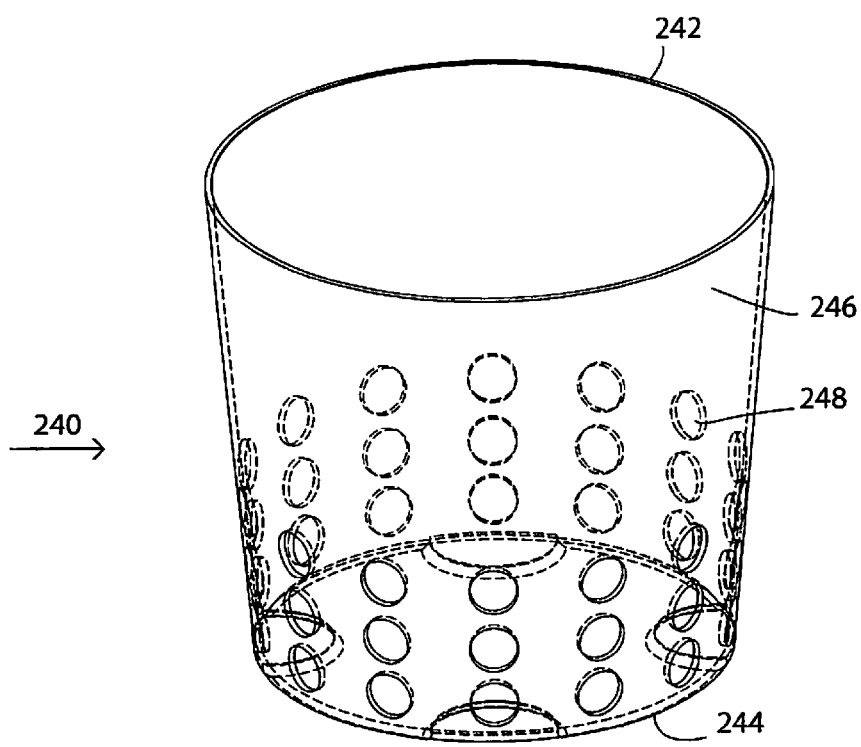
FIG. 8 is a perspective illustration of one part of the planter system.
Figure 7:
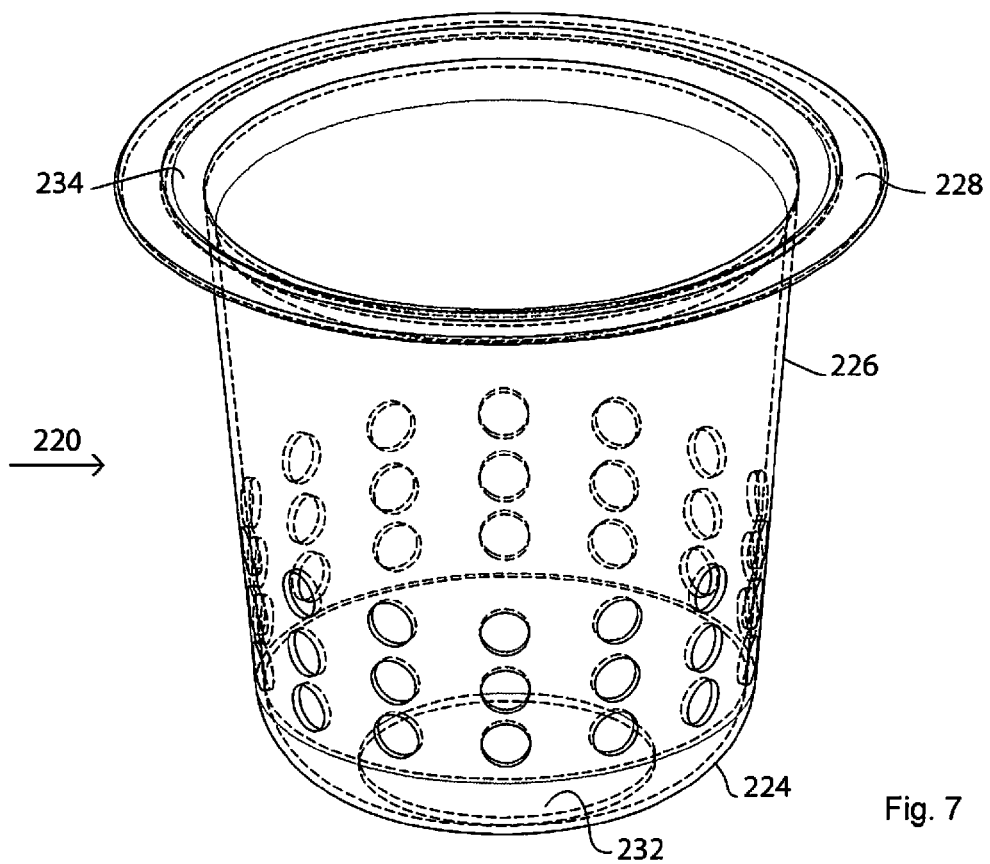
FIG. 7 is a perspective illustration of one part of the planter system.

Referring to FIGS. 7 and 8, yet another planter system is illustrated including a base 220 and an insert 240 of circular configuration when viewed from above. The parts of the planter system of FIGS. 7 and 8 are identified by the same two digit numbers as the corresponding parts of FIGS. 1 through 4 and, in addition, in FIGS. 7 and 8 the two digit numbers are preceded by the number 2. Thus, in FIGS. 7 and 8, the base 220 has a bottom 224 and side wall 226, holes 230 through the side wall and a top lip 228. The bottom or insert 240 includes a top 242, a bottom 244, and a sidewall 246, with holes 248 through the side wall. The use of the components of FIGS. 7 and 8 is the same as the components of FIGS. 1 through 4 and therefore will not be repeated, however, it should be noted that in FIG. 8, vertical channels are not illustrated. The reason they are not illustrated in FIG. 8 is that they are optional and their omission in FIG. 8 is to convey that if the distance between the outside diameter of the insert and the inside diameter of the base are sufficient, vertical channels are not required. This aspect of the planter system, namely, the vertical channels being optional, is applicable to all configurations of the base and insert, not just the circular configuration illustrated in FIGS. 7 and 8.

The foregoing is a complete description of the planter system. Many additional modifications may be made without departing from the spirit and scope of my contribution.

What is claimed is:

1. A planter system comprising:
   a first planter portion having:
      a first end including a lip disposed at an upper terminal edge of the first end, the lip defining at least one circumferential channel disposed inwardly from an outer edge of the lip;
      a second end interconnected to the first end by a first wall, the first wall having at least one aperture therethrough; and
      a first interior portion defined between the first and second ends and surrounded by the first wall; and
   a second planter portion having:
      a first end and a second end interconnected by a second wall, the second wall having at least one aperture there through, the second planter portion second end being smaller than the first planter portion first end; and
      a second interior defined between the first and second ends and surrounded by the second wall, the second wall defining at least one longitudinal channel spanning from the first end to the second end of the second planter portion,
   wherein the lip of the first planter portion defines a sidewall of the at least one longitudinal channel of the second planter portion when the second planter portion is coupled to the first planter portion.

2. The planter system of claim 1, wherein the lip of the first planter portion is outwardly extending.

3. The planter system of claim 1, wherein the second end of the first planter portion includes an interior receptacle.

4. The planter system of claim 1, wherein the at least one circumferential channel defined by the first end of the first planter portion and the at least one longitudinal channel defined by the second wall of the second planter portion are adapted to be in fluid communication with each other.

5. The planter system of claim 1, wherein the planter system is generally triangular in plan view.

6. A planter system adapted to be placed in a ground, the planter system comprising:
   a planter including:
      a top having an outwardly extending lip disposed at an upper terminal edge of the top, the lip defining at least one circumferential channel disposed inwardly from an outer edge of the lip;
      a bottom, the top and the bottom interconnected by a wall defining a plurality of apertures extending through the wall, the top, the bottom, and the wall defining an interior that is open at the top and closed at the bottom; and
   an insert having:
      a circumference sized to be disposed within the interior of the planter; and
      at least one vertical channel at least partially defined by the outwardly extending lip when the insert is disposed within the interior of the planter.

7. The planter system of claim 6, wherein the at least one circumferential channel opens into the interior of the planter.

8. The planter system of claim 6, wherein:
   said planter is of a generally triangular configuration in plan view.

9. The planter system of claim 6, wherein the at least one vertical channel is positioned inwardly of the outwardly extending lip.

10. A planter system adapted to be placed in a ground, the planter system comprising:
- a planter insert including:
  - a top; and
  - a bottom, the top and the bottom interconnected by a wall having at least one channel extending from the top toward the bottom of the plant insert, the wall defining a plurality of apertures extending there through, the top, the bottom, and the wall defining an interior that is open at the top and open at the bottom; and
- a planter base:
  - including an interior portion sized to receive the planter insert within the interior portion; and
  - having a top portion including a lip disposed at an upper terminal edge of the top portion, the lip defining at least one circumferential channel disposed inwardly from an outer edge of the lip, the lip forming a sidewall of the at least one channel of the planter insert when the planter insert is coupled to the planter base.

11. The planter system of claim 10, wherein the wall includes at least two channels extending from the top toward the bottom of the planter insert.

12. The planter system of claim 10, wherein the planter insert is generally of a triangular configuration in plan view.

\* \* \* \* \*